United States Patent [19]

Merlet et al.

[11] 3,959,606
[45] May 25, 1976

[54] INSTALLATION FOR CHECKING A REPEATER OF A TRANSMISSION ROUTE

[75] Inventors: Pierre Merlet, Bourg-la-Reine; Jacques Vernezy, Viroflay; Jean-Claude Barigot, Brie-Comte-Robert, all of France

[73] Assignee: Compagnie Industrielle des Telecommunications Cit-Alcatel, Paris, France

[22] Filed: Oct. 4, 1974

[21] Appl. No.: 512,154

[30] Foreign Application Priority Data
Oct. 4, 1973  France .................. 73.35506

[52] U.S. Cl. .................. 179/175.31 R
[51] Int. Cl.² .................. H04B 3/46
[58] Field of Search .................. 179/170 R, 175.3 R, 179/175.31 R

[56] References Cited
UNITED STATES PATENTS

| | | | |
|---|---|---|---|
| 3,458,661 | 7/1969 | Forde et al. .................. | 179/175.31 R |
| 3,519,935 | 7/1970 | Hochgraf .................. | 179/175.31 R |
| 3,692,964 | 9/1972 | Camiciottli et al. .................. | 179/175.31 R |

FOREIGN PATENTS OR APPLICATIONS

| | | | |
|---|---|---|---|
| 1,270,737 | 4/1972 | United Kingdom .................. | 179/175.31 R |

*Primary Examiner*—Kathleen H. Claffy
*Assistant Examiner*—Randall P. Myers
*Attorney, Agent, or Firm*—Craig & Antonelli

[57] ABSTRACT

The invention comes within the branch of the checking of repeaters formed by two semi-repeaters placed in units spaced out along a transmission network having multiple quads and comprising nodal derivation points for derivating a cable section into several cable sections. It concerns the checking of a predetermined repeater by looping the output of one of its semi-repeaters to the input of the other semi-repeater, by means of a relay logic circuit. The installation comprises means to choose the order number of a derivation, at each nodal point on the network.

14 Claims, 11 Drawing Figures

INSTALLATION FOR CHECKING A REPEATER OF A TRANSMISSION ROUTE

The present invention refers to the checking of a transmission route having several lines, equipped with repeaters placed in units spaced out along said route. It relates more particularly to the case in which each repeater assigned to a line is formed by two semi-repeaters, one for each transmission direction, and where the transmission route comprises, at certain repeater units constituting nodes on the route, branches in various directions, subdividing a group of lines of the route upstream from a node into several groups of lines downstream from that node.

A particularly advantageous method for checking a repeater of the transmission route consists in forming a loop between the output and the input of the two semi-repeaters which form it, through an element simulating an adequate length of cable.

This checking method has been effected in a simple way by the applicant in the case where the transmission route is constituted by a single cable including several quads or transmission lines, all of them having the same direction. The corresponding device has been described by the applicant in British Pat. No. 1,270,737, filed on Aug. 6, 1970. The checking method described in that patent consists in identifying the unit containing the repeater equipping a quad on test, by the sending, on the end of an auxiliary pair of wires in cable, of a signal which is characteristic of the unit containing that repeater, for example corresponding to the order of the unit. That auxiliary pair is equipped with unit selection devices, each selection device being assigned to the remote locating of a unit. Each unit is identified by means of a direct current sent through said auxiliary pair and interrupted by a number of cuts determined by the order of the unit in question. That direct current energizes successively the selection devices, at each new feeding of the auxiliary pair, to energize a terminal in the unit in question. In an identified unit, the repeater of the quad on test is looped, by switching means connected with each repeater, by the action of that energized terminal in said unit when the signal on the line corresponding to the repeater in question is interrupted temporarily.

In the embodiment given in the aforementioned patent by the applicant, the selection device of each repeater unit comprises a relay having a make-and-break contact, a break contact and contacts for feeding analogous terminals connected respectively with the repeaters in the unit corresponding to it. It comprises, moreover, a polarized relay having two reversing contacts; the windings of these two relays are in series on one of the wires of the auxiliary pair of the service quad. Diodes are connected up between the contacts and the wires of the auxiliary pair. In such selection devices equipping the service quad, the action of the polarized relay of each selection device is such that, a unit having been selected, the re-establishing of the direct current in the same direction, on the auxiliary pair has the effect of selecting the next unit along the transmission line, whereas the reversing of the direction of flow of the direct current, on this auxiliary pair, has the effect of cancelling the selection of one or the other of the units, that is, carries out a resetting to zero of the selection devices. The selection device of a repeater is constituted, for each repeater, in the unit which contains it, by a looping control relay for the concerned semi-repeaters, connected up to the circuit on test and whose contact is closed by the interruption of the signal, and a looping relay whose coil is in series with one of the aforementioned feed contacts of the selection device of that unit and the contact of the control relay.

Figure 1:
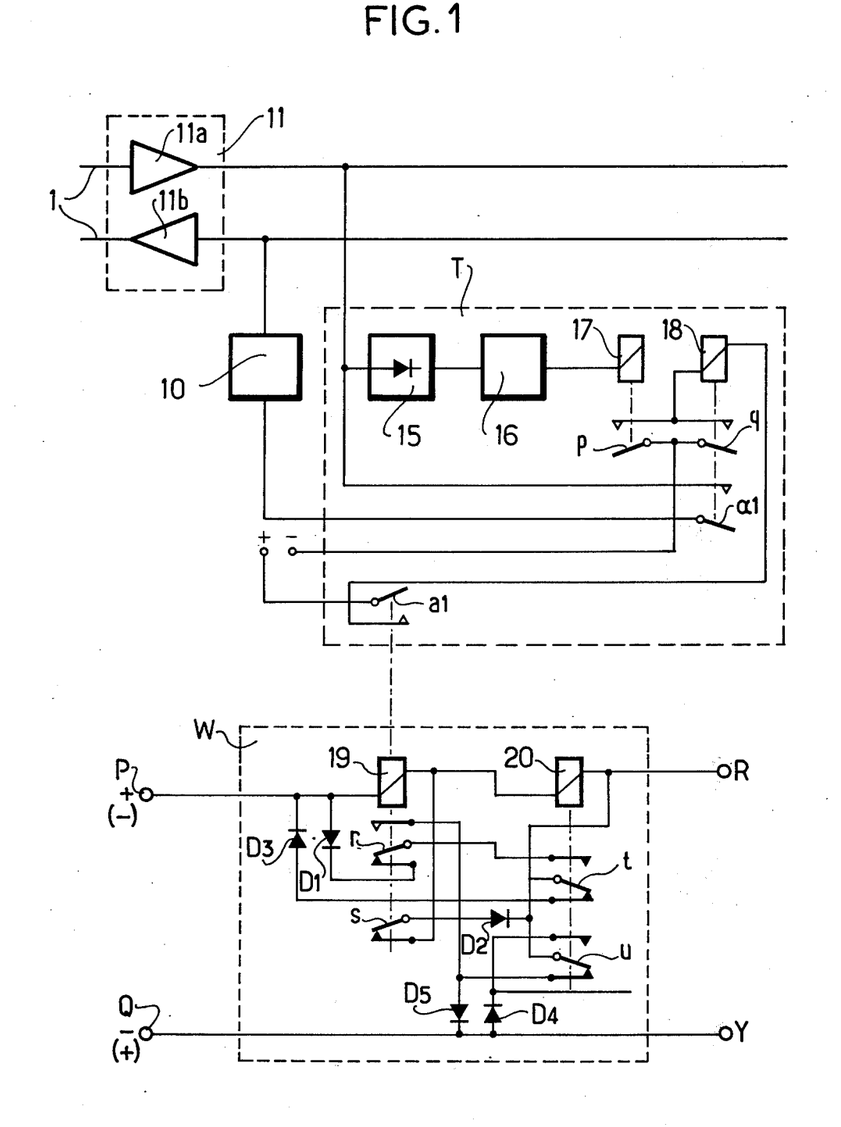
FIG. 1 is the known diagram of a device for selecting a unit of repeaters and of a device for selecting one of said repeaters of that unit, such as described hereinabove.

FIG. 1 of the drawing gives the diagram taken from the aforementioned patent by the applicant, showing the selection process of a repeater unit equipping a transmission line and of a repeater in the said unit.

On a single line 1, taken by way of an example, a unit which has not been shown contains a repeater 11 related to the line 1, formed by semi-repeaters 11a in one transmission direction and 11b in the opposite transmission direction. The looping of the output 11a to the input of 11b may be effected through an element 10 which simulates an appropriate length of transmission cable.

The aforementioned unit contains the repeaters related respectively to all the lines of a same cable; such units are spaced out all along the cable.

A circuit selection device T associated with each repeater and a unit selection device W related to all the repeaters of a unit as a whole are also arranged in that unit, the devices W and T co-operating to ensure the looping of the two semi-repeaters concerned in the unit.

The device T comprises, connected up to the output of the semi-repeater 11a, a signal detector 15, feeding, through a logic invertor 16, the coil 17 of a first relay having a make contact p; that contact p is closed when the signal at the input of 11a is cut off and is then energized with a negative-direct current voltage It comprises also a second relay whose coil 18 is connected to the contact p and to a controlled make contact a1 (feed contact) energized with a + voltage when it is closed.

That coil 18 controls two make contacts q and α1; the looping between the two semi-repeaters may be effected by the contact α1, connected up in series with the element 10, when the coil 18 is fed; the contact q, set to - when it is closed, is a hold contact for the looping as long as a1 remains closed.

The device W comprises two relays in series, 19 and 20, whose coils are fed in series by a wire PR, of an auxiliary pair PR, QY. The coil of the relay 19 controls two contacts, the one, a break and make contact r, the other a break contact s, comprised in the device W, and controls the feed contacts, such as the aformentioned contact a1, each comprises in one of the devices T associated with the respective repeaters of a same unit.

The relay 20 is a polarized relay, that is, having contacts which do not switch over on de-energization, but which retain their positions immediately before de-energization. The contacts change over when the direction of the current flowing through the relay energization coil is reversed. The coil of the relay 20 controls two reversing contacts t and u; diagrammatically shown by break contacts.

In the device W, the diodes D1 to D5 connect the wires PR and QY through the various aforementioned contacts, as shown in FIG. 1. During operation, when the wire P is set to + and the wire Q is set to -, a current passes through the coil 19, the coil 20, the upper contact t, the make contact r which is then closed, and the diode D5; the make contacts such as a1 are closed and ensure the selecting of that unit. When the aforementioned current is cut at the auxiliary pair, the contacts r and s are set in the break position, but the contacts t and u remain in their positions: a connection is formed between P and R through D1, the contact r which is in the break position, the upper contact of t for the next re-establishing of the current from P+ to Q—. When this re-establishing is effected, the current follows that connection, without energizing the coils 19 and 20 of the device W, to energize the two identical coils selection device for the following unit which is thus selected.

Other the current is reversed, that is, when Q is set to + and P is set to —, the diode D4 and the upper contact of u is closed, enable, by means of that reverse current, the energizing of the coil 20 which makes the contacts t and u change over to the low position.

To sum up, a single transmission cable installation may be controlled by devices such as T and W in the following manner:

To "mark" the first repeater unit equipping the cable, a current is made to pass through the auxiliary pair from P brought to + to Q brought to —.

To "mark" the second repeater unit, that current is cut in the coaxial pair and it is re-established in the same direction. One of the following units, let it be the $n^{th}$, will be "marked" according to the same method, i.e. by effecting $n-1$ current cuts from P+ to Q—.

To cancel the "marking" of a unit, the current is made to pass from Q set to + to P set to —.

In a "marked" unit, the looping of one of the repeaters is effected by the temporary interruption of the signal on the line concerned (in the corresponding circuit T, the contact p is closed and the coil 18 which is fed closes the contact $\alpha 1$).

In the case where the transmission route having several distinct lines comprises branches in different directions, the use of the control device according to the aforementioned patent would lead to the multiplying of the number of service quads equipped as described previously, using as many service quad as there are branches in different directions composing the transmission route.

The present invention has as its aim the avoiding of the necessity for such quantities of service quads for effecting the checking of a repeater on such a transmission route.

The present invention has for its object an installation for checking a repeater related to a quad of a transmission route comprising n quads and constituted by several sections of transmission cable each equipped with repeater units related to the quads belonging to it, the said route forming, from certain of the said units, then called nodes on the route, different branches to which correspond, at each node, at least two sections of cable coming from a same section of cable upstream from the node, so that the said route ensure the transmission of signals between a first terminal, where the n quads belonging to a same starting section of transmission cable start from, and, at the most, n second different terminals where different sections of cable respectively arrive at the said installation operating by internal looping of the repeater and comprising, in each repeater unit, a unit selection device fed by a first pair of auxiliary wires of a service quad, called a unit selection pair, to energize a first terminal of a looping control element related to each repeater of the unit and a repeater selection device fed by the corresponding transmission quad, related to each repeater to energize a second terminal of the said looping control element of each repeater by a transitory interruption of the signal on the corresponding transmission quad, the said installation being characterized in that it comprises, moreover:

Several sections of service quads associated with the transmission route and disposed from a same starting section of service quad at the said first terminal, in a manner identical to the sections of the transmission cable, by subdivisions at each node on the transmission route, to arrive in different sections of service quads respectively at the second terminals, each section of service quad comprising four wires two of which form the unit selection pair, being subdivided along the route and the other two form a second auxiliary pair, called a telephonic service pair being subdivided also along the channel;

At each node, a third auxiliary pair of wires, called a switching pair for connecting the upstream section of service quad to the downstream sections of service quad at this node, constituted, from the upstream service quad on the one hand by a first wire connected to the electrical middle point of an inductance connected up between the said telephonic service pair and on the other hand by the low-potential wire of the unit selection pair;

In each unit forming a node, selection devices for one of the downstream sections of service quads from the node, arranged in series and each having a relay fed by the said switching pair for controlling switching elements connected up between the upstream section of service quad from the node and the downstream sections of service quad from the node;

And a remote control device, switchable connected between two access terminals of the unit selection pairs of said starting section of service quad and between the switching pair constituted at each node, and sending out current gating pulses for the selecting of a repeater unit or for the selecting of a section of service quad at each node.

Figure 2:
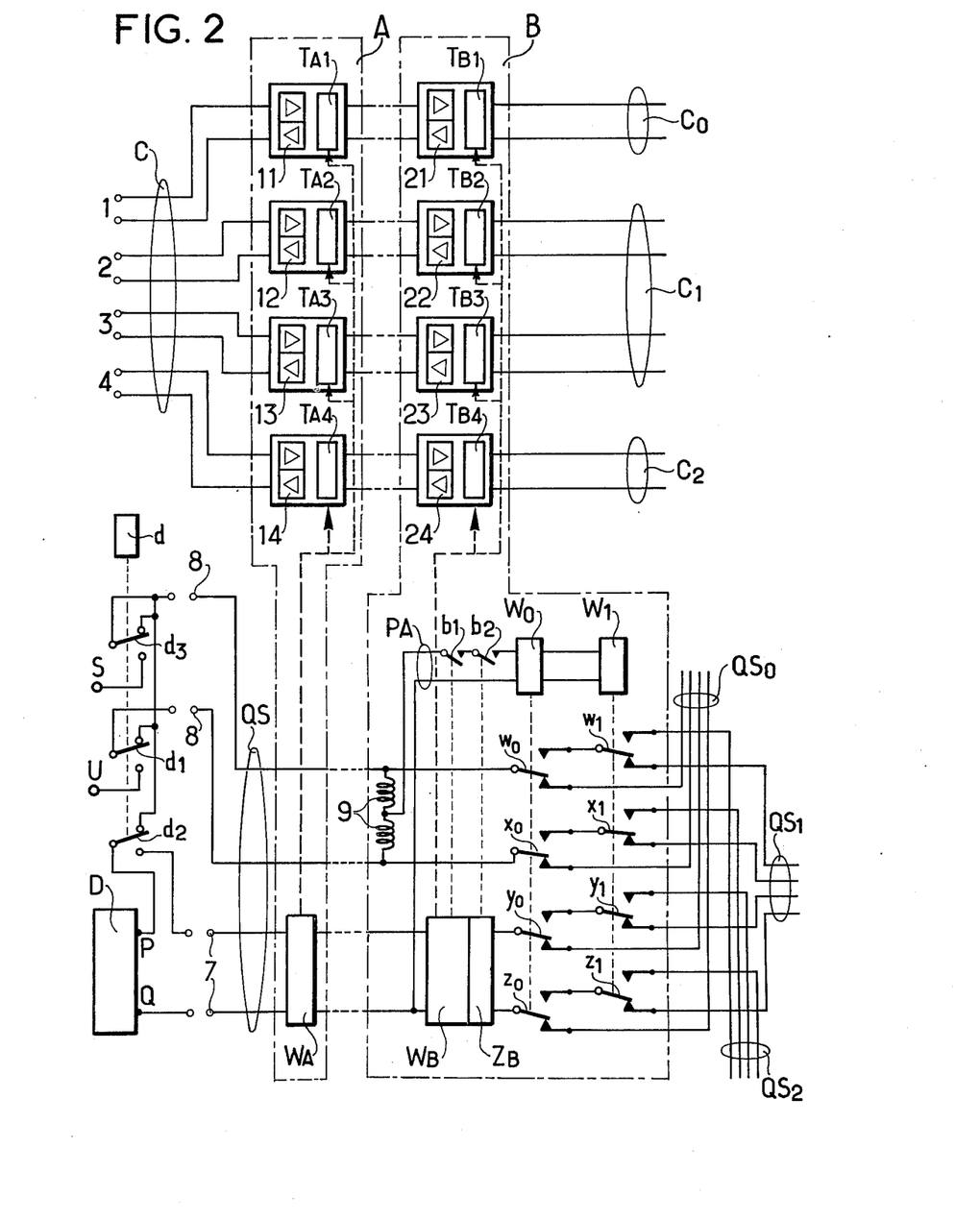
FIG. 2 is a diagram of a portion of installation according to the present invention, given in the case where a portion of the transmission route having n transmission quads is subdivided into three different directions, from a repeater unit called a node.

Othe characteristics and the advantages of the present invention will become apparent from the description of an embodiment given in the accompanying drawing, in which:

FIG. 2 shows a portion of transmission installation according to the invention in which are included unit selection devices such as W and circuit selection devices such as T, mentioned previously in FIG. 1.

That portion of installation comprises a portion of transmission route having four quads or transmission pairs designated respectively as 1, 2, 3, 4. These four quads belong originally to a same section of cable C on which are placed repeater units such as the units A and B shown. From the unit B, the transmission channel forms three branches subdividing the upstream cable C into three distinct cables C0, C1, C2 constituting three transmission lines in different directions.

The unit A contains the repeaters 11, 12, 13, 14 each relates to channels constituted by the quads 1 to 4. It contains the circuit selection devices previously mentioned in FIG. 1 designated as TA1 to TA4 and including, here, with a view to simplifying the illustration, the element simulating a length of cable through which the looping of each of the repeaters is effected (element 10 in FIG. 1). The unit A contains, moreover, the unit selection device, such as W in FIG. 1, designated as WA. That selection device WA is fed by a first auxiliary pair of wires 7 of a service quad QS comprising a second auxiliary pair of wires 8. The auxiliary pair 7 transmits a continuous current normally from P+ to Q— and is called the unit remote locating pair or unit selection pair; the auxiliary pair 8 can transmit voice signals and is called the telephonic service pair. The service quads QS is associated to the section of cable C.

The unit B, on the cable C, from which the branches C0, C1 and C2 are formed (such a unit B then being called a node on the transmission route) contains repeaters 21, 22, 23 and 24 related respectively to the channels 1 to 4. It contains also circuit selection devices such as T in FIG. 1, designated as TB1, TB2, TB3 and TB4 containing, here, too, the incorporated elements (such as 10 in FIG. 1) through which the looping of each repeater is effected.

At the node B, from the two auxiliary pairs 7 and 8 of the service quad QS, a third auxiliary pair, called the switching pair PA is constituted. That switching pair PA is constituted on the one hand by a first wire connected to the electrical middle of an inductance 9 connected up between the two wires of the telephonic service pair 8 and short-circuiting the alternate signals of that pair and, on the other hand by a second wire connected to the wire (Q) which is normally at a low potential of the unit remote locating pair 7.

The unit B also contains a unit selection device, such as W in FIG. 1, designated as WB, which is associated to a switching control device ZB for the service quad QS co-operating with the device WB for ensuring the closing of two contacts b1 and b2 inserted on the said first wire of the switching pair PA. That unit B contains, moreover, two switching selection devices, similar to the device W in FIG. 1 and designated here as W0 and W1, each controlling four reversing contacts, diagrammatically shown by double break contacts $w, x, y, z$ enabling a "splitting up" of the service quad QS before the node B into as many service quads QS0, QS1, QS2, as there are different branches C0, C1, C2.

The first assembly of those four contacts $w\ x\ y\ z$ to which the index 0 has been assigned, controlled by W0, is connected up to the four wires of the service quad QS. By their respective lower contacts, they constitute the service quad QS0 connected with the cable C0.

The second assembly of these four contacts $w\ x\ y\ z$ to which the index 1 has been assigned, controlled by W1, is connected up to the upper contacts of the previous assembly $wo\ xo\ yo\ zo$. By the respective lower contacts of $w1, x1, y1, z1$, the service quad QS1 connected with the cable C1 is selected.

The last service quad QS2 associated to the cable C2 is constituted by the tappings on the upper contacts of the assembly $w1, x1, y1, z1$.

It will be observed that each of service quads QS0 to QS2 assigned to one of the cables C0 to C2 can fulfill the function of the original four-wire group QS, at the level of another node belonging to one of the cables C0, C1 or C2. At each node, from the upstream service quad, an inductance, such as 9, makes it possible to constitute a new switching pair, such as PA, from the telephonic service pair, such as 8, and from the wire Q of the remote locating pair 7. That new switching pair is also equipped with two contacts, such as b1 and b2, controlled by the selection devices of that node, such as WB and switching control devices, such as ZB.

The installation according to FIG. 2 is, moreover, completed by a remote locating control device D for the unit, of a known type, connected up to two access terminals of the pair 7 and operating, for example, by the sending of a number of current gating pulses corresponding to the order of the unit to be selected. To this remote locating control device D is connected a switching element, or inverter, connected up to the access terminals P, Q, S and U of the pairs 7 and 8. That switching element is, here, of the manual type with a control knob d and three inverters $d1$, $d2$ and $d3$ connected up as shown in FIG. 2. The inverters $d1$ to $d3$ make it possible to connect up the remote locating control device D either to the pair 7 of the service quad QS (low position of the inverters $d1$ to $d3$), or to the pair 8 of service quad QS (high position of the inverters $d1$ to $d3$), for the high position of inverters, the two wires of the pair 8 are short-circuited. These inverters $d1$ to $d3$ make it possible to effect the selecting of one of the cables, here, C0 to C2, in each node by the sending on the pair PA, from the device D, of as many current gating pulses as there are branches from the node, these current gating pulses being intended to make one of the devices W0, W1 active.

Figure 3:
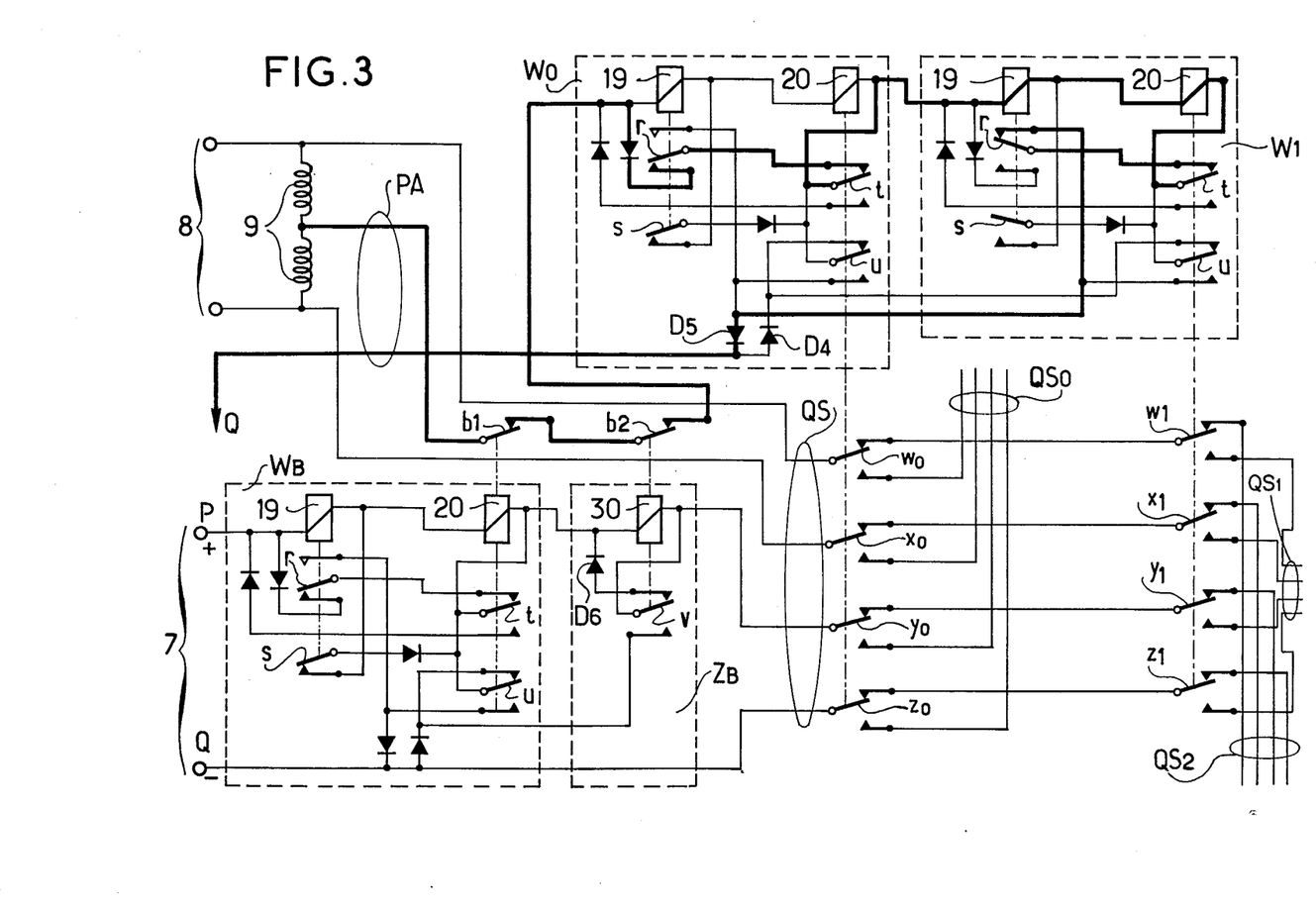
FIG. 3 is a diagram of the installation having at a node, for the selection of a direction of the connection from that node.

FIG. 3 shows in more detail the embodiment of the unit selection and branching devices to a node, for example, node B in FIG. 2, and makes it possible to explain, in common with FIG. 2, the operation of the installation for the checking of a repeater. The device WB assigned to the selecting of the unit B, the switching control device ZB and the devices W0 and W1 assigned to the switching selection have been shown therein. To lighten that figure, the references of certain diodes have been omitted, whereas all the identical elements of these devices bear the references used in FIG. 1.

In the unit B, the polarized relay 20 of WB controls the extra contact b1 connected up to the wire of the switching pair PA, connected to the electrical middle point of the inductance 9 connected up between the wires of the telephonic service pair 8.

The switching control device ZB comprises a polarized relay 30 whose coil is in series with the coils of the relays 19 and 20 of the device WB for the selection of the unit B. The coil of the relay 30 controls a reversing contact $v$ diagrammatically shown also by a double break contact, whose upper contact is connected through a diode D6 between the coils of the relays 20 and 30, whose moving plate is connected up to the other terminal of the coil of the relay 30 and whose lower contact is connected to the upper contact u. The coil of the relay 30 also controls the extra contact b2 in series with b1 on the pair PA.

In the unit B also, the devices W0, W1 are each similar to the device W in FIG. 1; the practical differences in connecting up reside in the use in common for the devices W0 and W1 taken as a whole, of the two diodes, the diodes D4 and D5 identified here, connecting up on the one hand the upper contacts u which are interconnected and on the other hand the lower contact u which are interconnected of the devices W0, W1, to the wire of the pair PA connected up at Q. Moreover, it will be noted that it is the coils of relays 20 of the devices W0, W1 which control the reversing contacts w x y z for switching original service quad QS on one of the portions of quads QS0, QS1 or QS2 associated to each of the cable branches starting from the node B.

FIGS. 4a to 4g are diagrams corresponding to various states of operating of the devices WB and ZB of the unit B forming a node as well as the positions of the related contacts b1 and b2; the various states assumed by the device WA are identical to those of the device WB. The paths of currents are shown in thick lines.

Figure 4A:
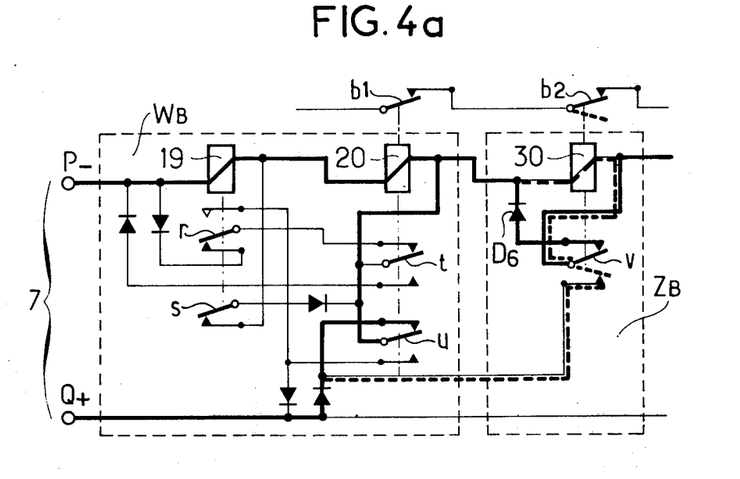
FIGS. 4a to 4g are diagrams illustrating various possible states of the device forming a part of the installation.
Figure 4B:
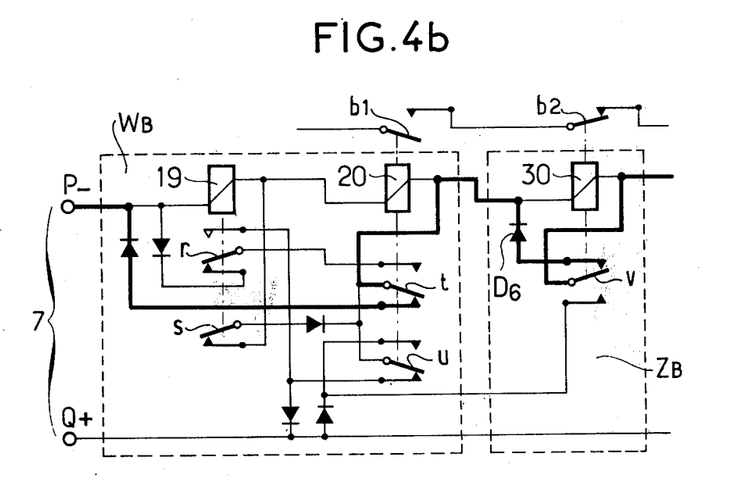

FIGS. 4a and 4b show the setting to zero of the device WB and ZB.

In FIG. 4a, it is assumed that the unit B has been selected during a previous operation; the relays 19, 20 and 30 are therefore in the position indicated: relays r and s in the break position, upper contacts of t, u and v closed, contacts b1 and b2 closed. The resetting to zero is effected by the passing of a current from Q set to + to P set to −. The current is set up through the upper contact of u and the coils 20 and 19, the coil 30 is short-circuited. The upper contact v is closed.

FIG. 4b shows the state assumed by the contacts under the effect of that current. The relay 20 tilts: the lower contacts of t and u close; b1 opens. The relay remains in its previous position. This is the stable reset to zero state.

FIGS. 4c to 4g show diagrammatically the stages leading to the active state of the devices WB and ZB.

Figure 4C:
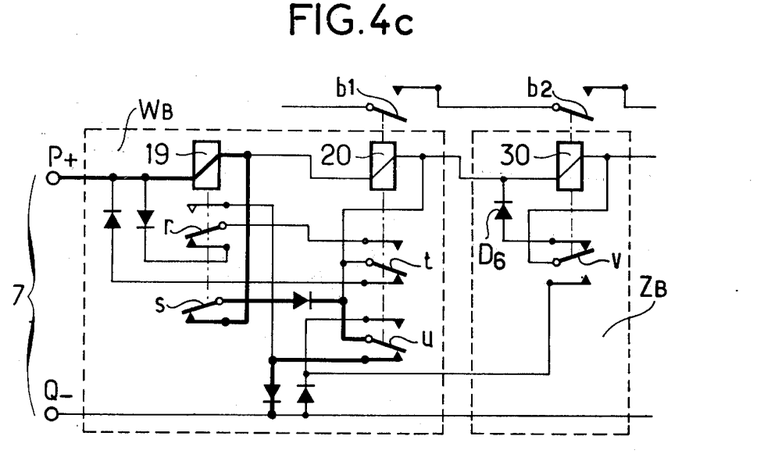

In FIG. 4c, the devices WB and ZB having been reset to zero (FIG. 4b), a current is made to pass from P set to + to Q set to −. The current flows temporarily through coil 19, break contact s and lower contact of u.

Figure 4D:
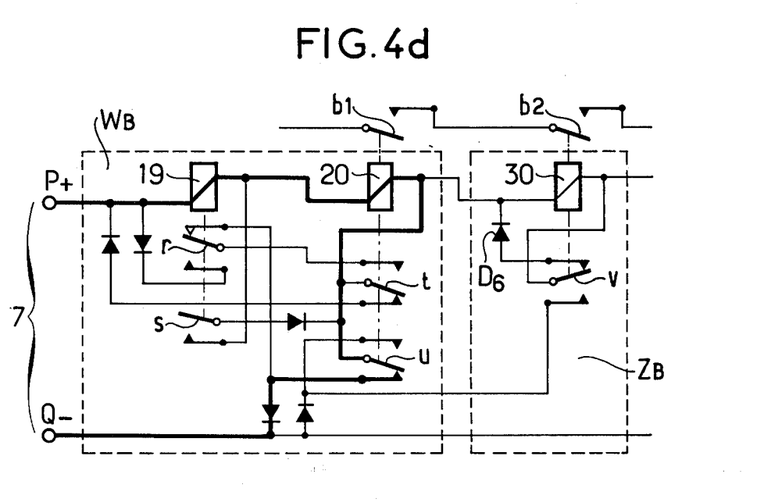

In FIG. 4d, it may be seen that the transitory current in FIG. 4c makes the relay 19 switch over: the make contact r closes and a transitory current passes through the coils 19 and 20 and the lower contact of u.

Figure 4E:
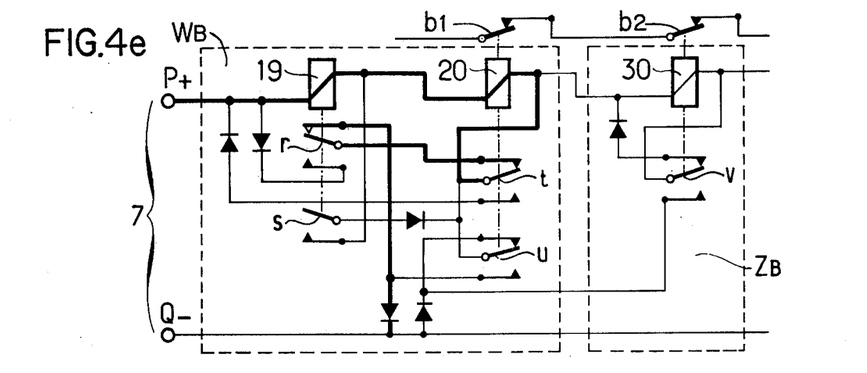

In FIG. 4e, the transitory current in FIG. 4d crossing through the coil 20 makes the contacts t and u switch-over into upper positions, setting up a new circuit for the flowing of the current through the coils 19 and 20, the upper contact t and make contact r; the contact b1 closes; b2 remains closed. In FIG. 4e, the circuit is in the stable state for the selection of the unit B.

Figure 4F:
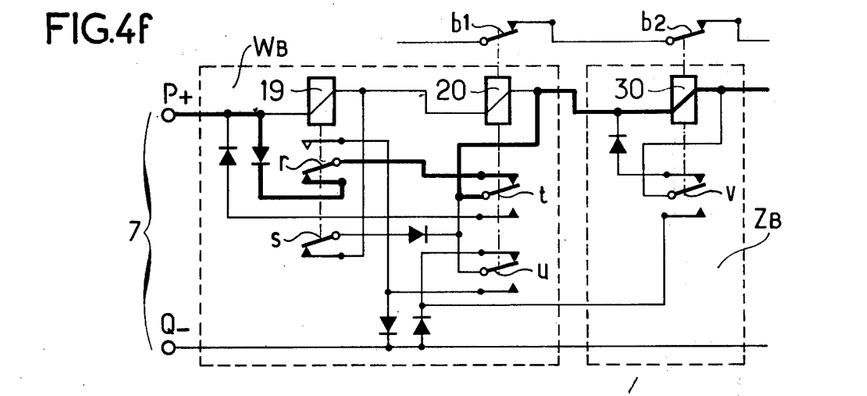

In FIG. 4f, the preceding current has been interrupted, the contacts r and s have then come to the break position whereas the contacts t and u remain in their previous position and then the current is re-established in the same sense from P+ to Q− for the selection of the following unit along the node B: the coils 19 and 20 are short-circuited by the break contact r and the upper contact t; the current will flow, temporarily from P+ to Q− through the coil of the relay 30 and along the circuit in FIG. 4c through the selection device, such as WB, of the next unit.

Figure 4G:
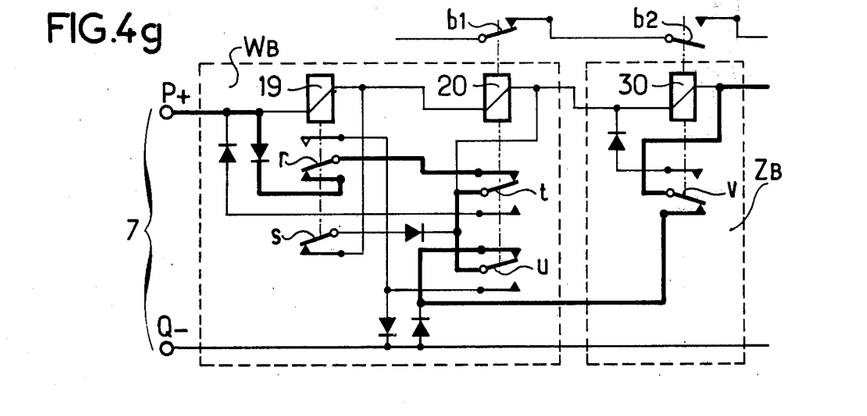

In FIG. 4g, it may be seen that the preceding current through the coil 30 has made its contact v change over into the downward position: in that case, the coils 19, 20 and 30 are all three short-circuited by the break contact r, the upper contacts t and u and the lower contact v; the contact b2 opens. In the selection device such as WB of the next unit, the states of FIGS. 4d and 4e are obtained.

With a view to completing these diagrams of states of the device. WB and ZB, at the time of a resetting to zero after the selection of a unit beyond a node, such as B, for which the lower contact of v has been closed (FIG. 4g), it will be ovserved that, with respect to FIG. 4a, the setting up of a current for resetting to zero (from Q at + to P at −) will be effected in the direction of the circuit shown in thick lines for the device WB, but not, now, according to the thick lines in the device ZB, but according to the interrupted lines. In this case, the current through the coil 30 will make the contact v change-over into the upward position, this leading to the stable state in FIG. 4b.

The operation of the installation is given hereinafter taking into consideration the figures, in the case where it is required, for example, to check the twelfth repeater, counting from route origin, related to the channel 4; that channel 4 belongs to the cable C equipped with five units such as A and a sixth unit B, forming the first node common to C0, C1, C2, then that channel 4, after the node B, belongs to the cable C2.

To select the direction of transmission given by the cable C2 equipped with the repeater in question which is to be checked, firstly, the node B is located with a view for selection of service quad QS2 associated to cable C2.

For that purpose, the inverters d1, d2 and d3 are set in the low position: the remote locating device D is connected to the remote locating pair 7. A current is transmitted from the device D setting Q to − and P to + for effecting the resetting to zero of the various unit selection devices; the devices such as WA and ZB are set to zero; the contacts which they comprise are in the state given by FIG. 4b. A current is subsequently set up, from P at + to Q at −, six times successively, from the device D; this leads to the selecting of the first node by the setting of the devices W and Z contained in that unit to the state given in FIG. 4e.

The selecting of the direction C2, among the directions C0, C1, C2 existing behind the node is then made possible; the contacts b1 and b2 being closed on the switching pair PA. It is obtained by the switching of the device D for controlling the remote locating on the switching pair PA by means of the inverters d1, d2 and d3 set in the high position. A resetting to zero of the switching devices W0 and W1 is effected from D by setting, on the pair PA, Q to + and the wire coming from the electrical middle of the inductance to −, the contacts r, s and t, u assuming the positions shown in FIG. 4b for the device WB, the contacts w, x, y, z being set also in the low position as diagrammatically shown in FIG. 2.

It will be observed that when the node has been selected, the contacts b1 and b2 are closed; the resetting to zero of the devices W0, W1 by the control device D connected to the switching pair PA, causes the closing of the lower contacts wo, xo, yo, zo, more particularly, and hence switches the quad QS to quad QS0. The selecting of the direction of connection given by the cable C0 is therefore immediately effected.

To effect the selecting of the direction of connection given by the cable C2, two current gating pulses are transmitted from the control device D from P+ to Q− in the pair PA. The current flows as diagrammatically shown in thick lines in FIG. 3: the device WO is set to the state given for WB in FIG. 4f, the upper contacts wo, xo, yo, zo have been closed by the flow of the first gating current and remain in that position; the device WI is set in the state given for WB in FIG. 4e: the upper contacts w1, x1, y1, z1 close. The quad QS2 is therefore switched to the quad QS.

The selecting of the twelfth repeater to be checked on the channel 4 is effected by the switching of the control device D on the pair 7, by the inverters d1, d2 and d3 reset to the low position, by resetting to zero (Q at + and P at −) devices such as WA, WB and devices similar to WA equipping the unit selection pair of quad QS2 which is now switched to quad QS.

The selecting of that twelfth repeater, not giving rise to any passing of an extra node, is effected by the sending of twelve current gating pulses from the control device D on the pair 7 of the quads QS and QS2 which are interconnected.

Thus, that twelfth unit containing the repeater to be checked on the channel 4 is "marked": the feed contacts such as a1 in FIG. 1, in that unit, are closed. An interruption of the signal on the channel 4 closes the make contacts $p$, then $q$ and $\alpha 1$ of the corresponding circuit 7 (FIG. 1) for the looping of that particular repeater of the marked unit.

It will be understood that if that unit selection gives rise to a passing of an extra node, other than B, a selection of connection direction similar to that effected and described at the node B is effected in the same way.

Figure 5:
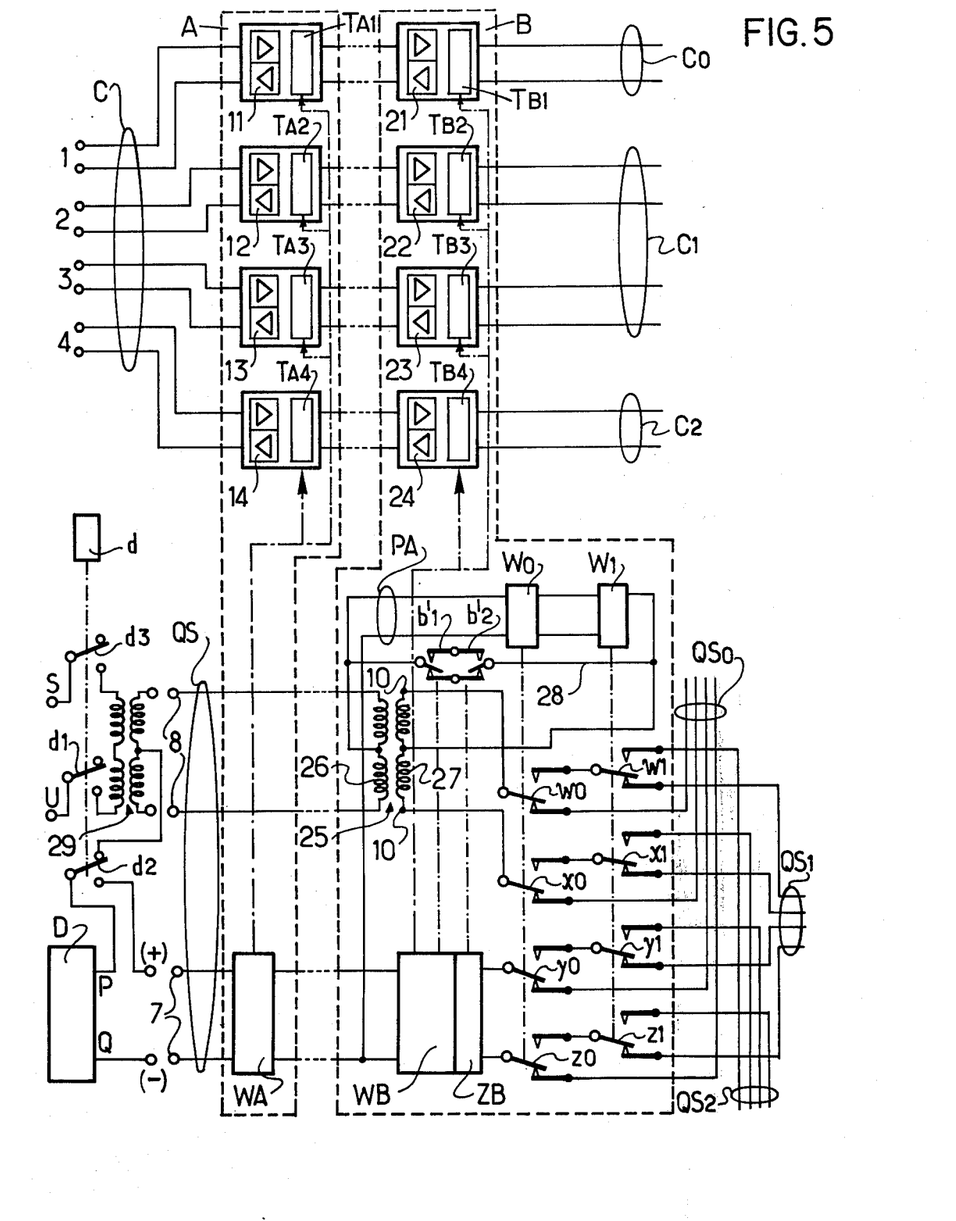
FIG. 5 is a diagram of a portion of installation according to the present invention, corresponding to a variant of the embodiment according to FIG. 2.

FIG. 5 gives a variant of embodiment of the installation according to FIG. 2; it makes use of circuits identical to those used in FIG. 2. Such circuits have been designated by the same references as those which were given them previously; they will not be described in detail herebelow. Only the differences included in FIG. 5 are described hereinafter.

At the node B, from the two auxiliary pairs 7 and 8 of the service quad QS, the auxiliary pair called the switching pair PA is formed. For that purpose, the node B comprises a transformer 25 having two windings — a primary winding and a secondary winding, 26 and 27 — each having a mid-point. The auxiliary switching pair PA is constituted by a first wire connected to the mid-point of the primary winding 26 connected up between the telephonic service pair 8 and by a second wire connected to the low potential Q (−) of unit remote locating pair 7.

The unit B also contains the unit selection device WB to which is associated the control switching device ZB of the service quad QS. That device ZB co-operates with the device WB for controlling two double contacts $b'1$ and $b'2$ connected up on a lead 28 linking together the two electrical middles of the two windings — the primary winding 26 and the secondary winding 27 — of the transformer 25. The two upper contacts of the double contacts $b'1$ and $b'2$ are interconnected; the two lower contacts are also interconnected.

The installation also contains the two switching selection devices W0 and W1. The switching selection devices W0 and W1 are inserted on the switching pair PA. At the output of the device W1, the top wire of the pair PA (that is, the wire connected to the mid-point of the primary winding 26) is connected to the mid-point of the secondary winding 27 of the transformer 25.

Each of the devices W0 and W1 controls the four inverter contacts $w$, $x$, $y$ and $z$ which are assigned to it and which enable the splitting up of the service quad QS at the node B into as many service quads QS0, QS1, QS2 as there are different branches C0, C1, C2.

It will be observed that each of the service quads QS0 to QS2 assigned to one of the cables C0 to C2 may fulfill the function of the starting service quad QS at the level of a subsequent node belonging to the corresponding section of cable C0, C1, C1, C2. At each node, a transformer, such as 25, makes it possible to constitute the switching pair such as PA, at that node. That switching pair is equipped in a similar manner to that of the node B (devices W0, W1 . . . and contacts $b'1$ and $b'2$ which are controlled by the devices WB and ZB).

In the installation shown in FIG. 5, a transformer 29 is connected with the unit remote locating control device D, and with the switching element diagrammatically shown by three inverters d1 to d3. The primary winding of the transformer 29 is connected by the inverters d1 and d2, set on their low contacts, at the access terminals S and U of the telephonic service pair 8. The inverters d1 to d3 make it possible to connect up the remote locating control device D either to the pair 7 of service quad QS (low position of the inverters) or between the lower wire of the pair 7 and the electrical mid-point of the secondary winding of the transformer 29 (high position of the inverters d1 to d3). By means of these inverters, the remote locating control device D makes it possible to send as many current gating pulses as there are branches to a node and hence to make active one of the devices W0, W1, that is, to select one of the service quads QS0 to QS2 assigned to the cables C0 to C2 respectively.

In this variant, the operation of the double contacts $b'1$ and $b'2$ is as follows:

When a unit is located before the node B, the contacts $b'1$ and $b'2$ are in the low position. In this case, the electrical middles of the windings 26 and 27 of the transformer 25 are connected up together by the lead 28; the switching control devices W0 and W1 are then short-circuited;

When a unit is located after the node B, the contacts $b'1$ and $b'2$ are set in the high position by the devices WB and ZB. The connection 28 is also closed and the devices W0 and W1 are also short-circuited;

When the node B is located, the contact $b'1$ is set in the high position by the device WB; the contact $b'2$ is in the low position. The mid-points of the windings 26 and 27 of the transformer 25 are connected through the devices W0 and W1. The remote locating control device D then emits the appropriate number of gating pulses on the switching pair PA (d2 is in the high position) to make the devices W0, W1 ensuring the selection of one of the directions C0, C1 and C2 active.

It will be observed that, when it is required to select a branch from a node situated beyond the node B, the mid-points of the windings of the transformers such as 25 are interconnected: the current gating pulses emitted by the device D flow through the transformers, such as 25, to end up at the switching pair PA constituted in that node and actuating the swtiching control devices, such as W0, W1 belonging exclusively to that node.

The present invention had been described with reference to an example. It is obvious that without going beyond the scope of the invention, details may be modified in the embodiments illustrated and certain means therein may be replaced by others which are technically equivalent. More particularly, in the examples of embodiments illustrated and described, all the switching functions are performed by electromechanical relays; that technology has no limiting character: other types of relays may be used, more particularly electronic switching elements. Likewise, the device D may be equipped with automatic elements dispensing with all manipulation, here described as being manual by the knob d, without going beyond the scope of the invention: a single control data item, characteristic of a repeater contained in one of the units, applied to the device D can automatically set off the selection process described previously in detail.

What is claimed is:

1. In an installation for checking a repeater related to a quad of a transmission route, said transmission route including n quads and being constituted by several sections of transmission cable, each of said sections of transmission cable being equipped with a plurality of repeater units related to said quads, said repeater units being spaced along the length of each section of said transmission cable, wherein said transmission route branches into different ones of said sections of transmission cable at predetermined ones of said repeater units, thereby forming a node, and said transmission route transmitting signals between a first terminal, at which said n quads are included in a single starting section of said transmission cable, and at most n second different terminals determined by said different sections of said transmission cable branching from said single starting section, said installation comprising:

in each repeater unit, a unit selection device for energizing a first terminal of a looping control element related to each repeater of said repeater unit, said unit selection device being supplied by a first pair of auxiliary wires of a service quad, called a unit selection pair, and a repeater circuit selection device for energizing a second terminal of said looping control element of each repeater by transitory interruption of a signal on the corresponding transmission quad associated with said repeater;

at least one service quad associated with said transmission route, said service quad including a starting section at said first terminal associated with said starting section of said transmission cable and a plurality of different sections of service quads branching at each node associated with said different branches of said transmission cable, each section of said service quad including said unit selection pair, being subdivided along said transmission route at said nodes, and a second auxiliary pair of wires also being subdivided along said transmission route at said nodes;

at each node, a third auxiliary pair of wires, called a switching pair, for connecting an upstream section of said service quad to a downstream section of said service quad at said node, said third auxiliary pair of wires constituted from said upstream service quad by a first wire connected to the electrical middle point of an inductance connected between said second auxiliary pair of wires and a low potential second wire of said unit selection pair;

in each repeater unit at a node, selection devices for selecting one of said downstream sections of said service quads branching from said node, said selection devices being arranged in series, and each of said selection devices including at least one relay supplied by said third auxiliary pair for controlling switching elements connecting said upstream section of said service quad and said downstream sections of said service quad; and a remote control device for supplying current gating pulses for respectively selecting one of said repeater units and a downstream section of said service quad at each node, said remote control device being switchably connected between two access terminals of said unit selection pair of said starting section of said service quad and between said third auxiliary pair at each node.

2. An installation according to claim 1, wherein a control device for controlling the connection of said upstream section of said service quad to one of said downstream sections of said service quad is disposed in each predetermined repeater unit at said nodes, said control device being arranged in series with said unit selection device, and wherein a first switching means controlled by said control device and a second switching means in series with said first switching means and controlled by said unit selection device are associated to said selection devices for selecting a respective downstream section of said service quad at said node.

3. An installation according to claim 2, wherein said unit device of each of said repeater units comprises a first relay controlling a break-and-make contact, a break contact and feed contacts for energizing said first terminal of said looping control element associated with each repeater of said repeater unit, and a second polarized relay controlling two reversing contacts, said second polarized relay having a coil in series with a coil of said first relay, said reversing contacts of said second polarized relay assuming a first position upon the flow of current in said coil in a first sense for selecting said repeater unit and maintaining said first position when the current is interrupted, and said reversing contacts assuming a second position upon the flow of current in an opposite sense, and wherein said second polarized relay controls said second switching means at each node.

4. An installation according to claim 3, wherein said control device includes a third polarized relay having a coil in series with said coil of said second polarized relay, said third polarized relay controlling second reversing contacts with two positions, and said third polarized relay controlling said first switching means.

5. An installation according to claim 4, wherein said first and second switching means are disposed in series on said third auxiliary pair of wires upstream from said selection devices.

6. An installation according to claim 4, wherein said first and second switching means are connected in parallel to said selection devices.

7. An installation according to claim 6, wherein said first and second switching means include two double contacts, each of said two double contacts having movable portions for opening the parallel connection with said selection devices.

8. An installation according to claim 7, wherein said inductance connected between said second auxiliary pair of wires is a primary winding of a transformer, said transformer having a secondary winding being connected at its electrical mid-point to said selection devices, said selection devices being connected to one wire of said third auxiliary pair of wires, said one wire being connected to the electrical mid-point of said primary winding.

9. An installation according to claim 6, wherein said inductance connected between said second auxiliary pair of wires is a primary winding of a transformer, said transformer having a secondary winding being connected at its electrical mid-point to said selection devices, said selection devices being connected to one wire of said third auxiliary pair of wires, said one wire being connected to the electrical mid-point of said primary winding.

10. An installation according to claim 2, wherein said first and second switching means are disposed in series on said third auxiliary pair of wires upstream from said selection devices.

11. An installation according to claim 2, wherein said first and second switching means are connected in parallel to said selection devices.

12. An installation according to claim 1, wherein each of said selection devices includes a first relay controlling a break-and-make contact and a break contact and a second polarized relay having a coil connected in series with a coil of said first relay, said second polarized relay controlling two first reversing contacts and four second reversing contacts, said four second reversing contacts constituting said switching elements, each of said reversing contacts assuming a first position when current flows in a first sense through at least one of said coils and maintaining said first position upon interruption of said current, and each of said reversing contacts assuming a second position upon current flow in an opposite sense in at least one of said coils.

13. An installation according to claim 1, wherein said remote control device is associated with a switching circuit having three reversing contacts connected respectively to access terminals of said second auxiliary pair and to the access terminal of the high-potential wire of said unit selection pair, said reversing contacts being controlled in a first position to connect said remote control device to said unit selection pair and in a second position to connect said remote control device to said third auxiliary pair of a predetermined node by short-circuiting said second auxiliary pair.

14. An installation according to claim 1, wherein each repeater in each of said repeater units includes two semi-repeaters in opposite transmission directions of said transmission route, the output of one of said semi-repeaters being connected to the input of the other of said semi-repeaters by said looping control element.

* * * * *